United States Patent
Syed

(10) Patent No.: US 6,203,656 B1
(45) Date of Patent: Mar. 20, 2001

(54) ACOUSTIC LINER MANUFACTURE

(75) Inventor: Asif A. Syed, Loveland, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/127,886

(22) Filed: Aug. 3, 1998

(51) Int. Cl.[7] ............................................. B32B 31/00
(52) U.S. Cl. ................................... 156/292; 181/288
(58) Field of Search .......................... 156/292; 428/116, 428/118; 181/210, 288, 290, 292; 244/1 N

(56) References Cited

U.S. PATENT DOCUMENTS

| | | | |
|---|---|---|---|
| 4,265,955 | 5/1981 | Harp et al. .......................... | 428/116 |
| 4,271,219 * | 6/1981 | Brown ................................. | 428/116 |
| 4,294,329 * | 10/1981 | Rose et al. .......................... | 181/222 |
| 4,336,292 * | 6/1982 | Blair .................................... | 428/116 |
| 4,421,811 | 12/1983 | Rose et al. .......................... | 428/116 |
| 4,465,725 * | 8/1984 | Riel ..................................... | 428/116 |
| 4,475,624 * | 10/1984 | Bourland, Jr. et al. ............... | 181/292 |
| 5,041,323 * | 8/1991 | Rose et al. .......................... | 428/116 |
| 5,460,864 * | 10/1995 | Heitkamp ............................ | 426/116 |
| 5,460,865 * | 10/1995 | Tsotsis ................................ | 426/116 |

\* cited by examiner

*Primary Examiner*—Francis J. Lorin
(74) *Attorney, Agent, or Firm*—Andrew C. Hess; Nathan D. Herkamp

(57) ABSTRACT

An acoustic liner is made by placing a raw adhesive septum between a pair of opposite honeycomb cores, and curing the septum to integrally bond the cores thereto.

29 Claims, 2 Drawing Sheets

ACOUSTIC LINER MANUFACTURE

BACKGROUND OF THE INVENTION

The present invention relates generally to gas turbine engines, and, more specifically, to noise attenuating acoustic liners therein.

A turbofan gas turbine engine powering an aircraft in flight produces noise in the inlet and exhaust ducts thereof. Inlet air flows firstly through a row of spinning fan blades which interact therewith for producing propulsion thrust with accompanying noise. A portion of the inlet air is compressed inside the engine and mixed with fuel and ignited for generating hot combustion gases which flow downstream through several rows of spinning turbine blades which extract energy therefrom, with the exhausted gas providing additional thrust and additional noise.

In order to attenuate both inlet and exhaust noise in the engine, the corresponding ducts typically include acoustic liners. A common acoustic liner is known as a two degree of freedom (2DOF) acoustic liner having two honeycomb cores joined together at an intermediate porous septum. The liner includes a face sheet over which the air or exhaust gases flow, and an opposite impervious back sheet suitably mounted in the corresponding flow duct.

The cells of the honeycomb cores are typically aligned with each other and are specifically sized for effecting Helmholtz resonators for attenuating noise. The septum is porous for acoustically coupling the outer and inner honeycomb cells for increasing the noise attenuation frequency range.

The multiple components of the acoustic liner increase the complexity of the manufacture thereof and attendant cost. In one manufacturing process, the honeycomb cores and septum are prefabricated and bonded together in an assembly. Bonding is effected by applying an adhesive along the edges of the honeycomb cells, assembling the cores on opposite sides of the septum, and curing the adhesive to bond together the cores and septum. However, the apertures of the septum are relatively small, on the order of several mils, and excess adhesive at the cell edges plugs the septum therealong and decreases the efficiency of noise attenuation.

Adhesive blocking of the septum apertures during manufacture may be decreased by more precisely controlling the manufacturing process, and providing additional steps. However, this substantially increases the cost of manufacture of the liner and is thusly undesirable.

Accordingly, it is desired to provide an improved method of manufacturing acoustic liners with increased simplicity and without adhesive blocking of septum apertures.

SUMMARY OF THE INVENTION

An acoustic liner is made by placing a raw adhesive septum between a pair of opposite honeycomb cores, and curing the septum to integrally bond the cores thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAIL DESCRIPTION OF THE INVENTION

Figure 1:
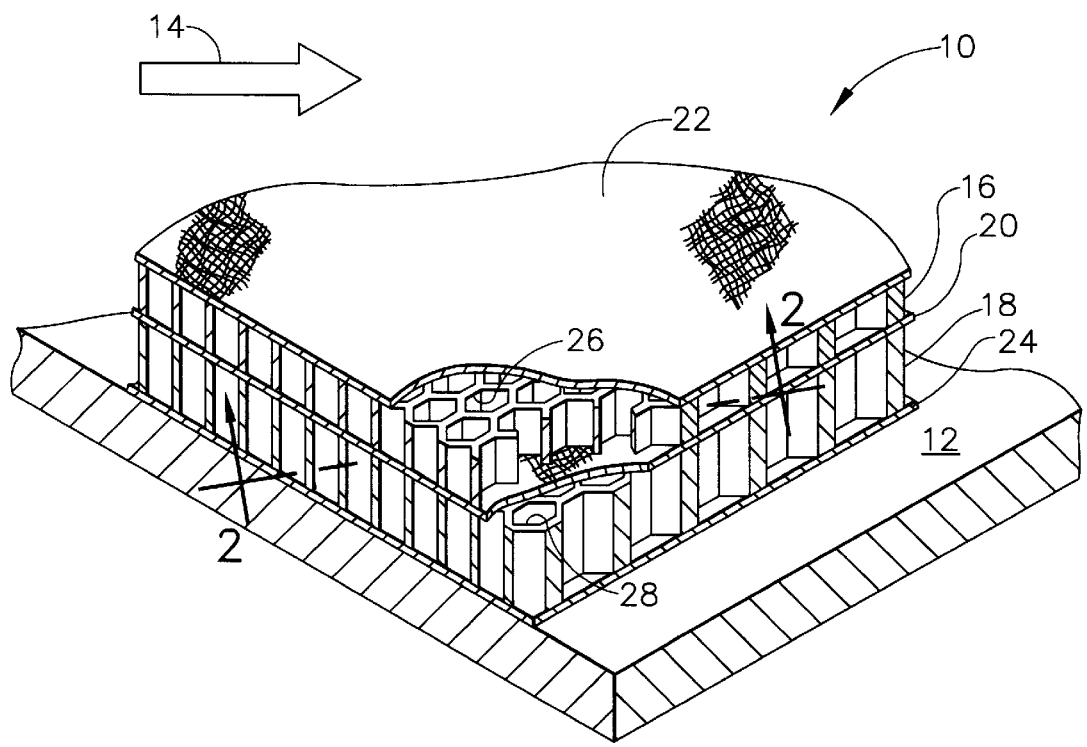
FIG. 1 is an isometric view of a portion of an acoustic liner having a pair of honeycomb cores integrally bonded to a septum in accordance with an exemplary embodiment of the present invention.

Illustrated in FIG. 1 is a portion of an acoustic liner 10 in accordance with an exemplary embodiment lining a portion of an annular fan inlet duct 12 of an aircraft turbofan engine through which flows air 14 for producing propulsion thrust during operation. The engine includes fan rotor blades (not shown) for pressuring the air 14 flowing thereover, with attendant noise being generated during operation. The acoustic liner 10 is configured and sized for attenuating such inlet noise. The acoustic liner may also be used in any other application for attenuating noise from a flow stream.

The exemplary acoustic liner 10 illustrated in FIG. 1 includes a first or outer honeycomb core or panel 16 generally aligned with a second or inner honeycomb core or panel 18 and separated therefrom by a thin septum 20. The cores 16, 18 may take any conventional configuration and size for effecting a two degree of freedom (2DOF) acoustic liner for attenuating flow stream noise during operation.

The liner 10 includes a porous face sheet 22 which may have any conventional configuration with single or multiple layers for providing acoustic coupling into the first core 16 during operation. The opposite side of the liner 10 includes an impervious back sheet 24 adjoining the duct 12, and may have any conventional configuration.

Figure 2:
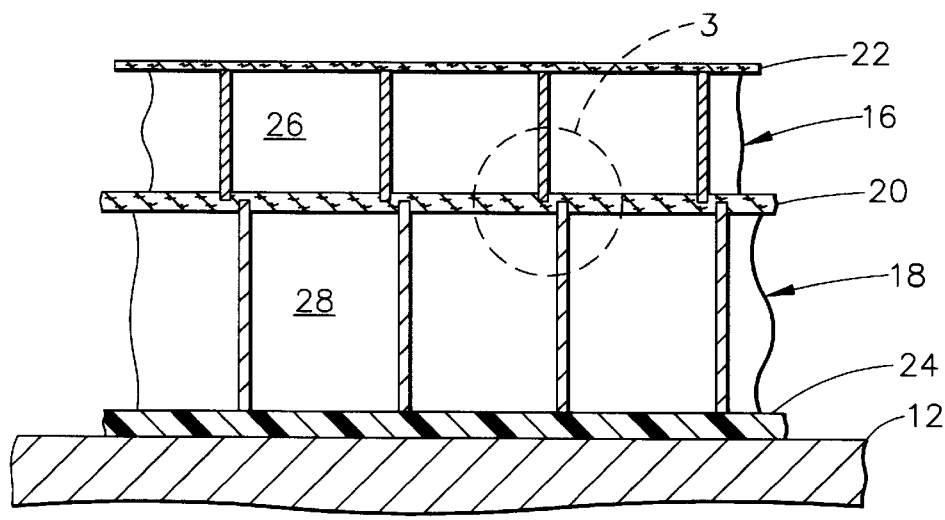
FIG. 2 is an enlarged elevational sectional view through a portion of the liner illustrated in FIG. 1 and taken along line 2—2.

In the exemplary embodiment illustrated in FIGS. 1 and 2, the first core 16 includes a plurality of laterally adjoining hexagonal cells 26 which are generally aligned atop corresponding hexagonal cells 28 of the second core 18, with the septum 20 being disposed therebetween.

The double core acoustic liner 10 illustrated in FIGS. 1 and 2 is basically conventional in configuration and operation for attenuating flow stream noise during operation, but includes a novel septum 20 which substantially simplifies the manufacture thereof and eliminates the undesirable adhesive blocking of prior art porous septums.

More specifically, the septum 20 is initially provided as a raw adhesive sheet and is placed in abutting contact between the pair of opposite honeycomb cores 16,18 in a sandwich assembly. The septum 20 itself provides an adhesive so that upon curing of the septum 20 both cores 16, 18 are integrally bonded together by the cured septum. In this way, the separate process step(s) of applying a suitable adhesive to the individual cores for bonding them to a discrete prefabricated septum is no longer required, and such adhesive is thereby eliminated and is not available for clogging the porous septum 20.

Figure 3:
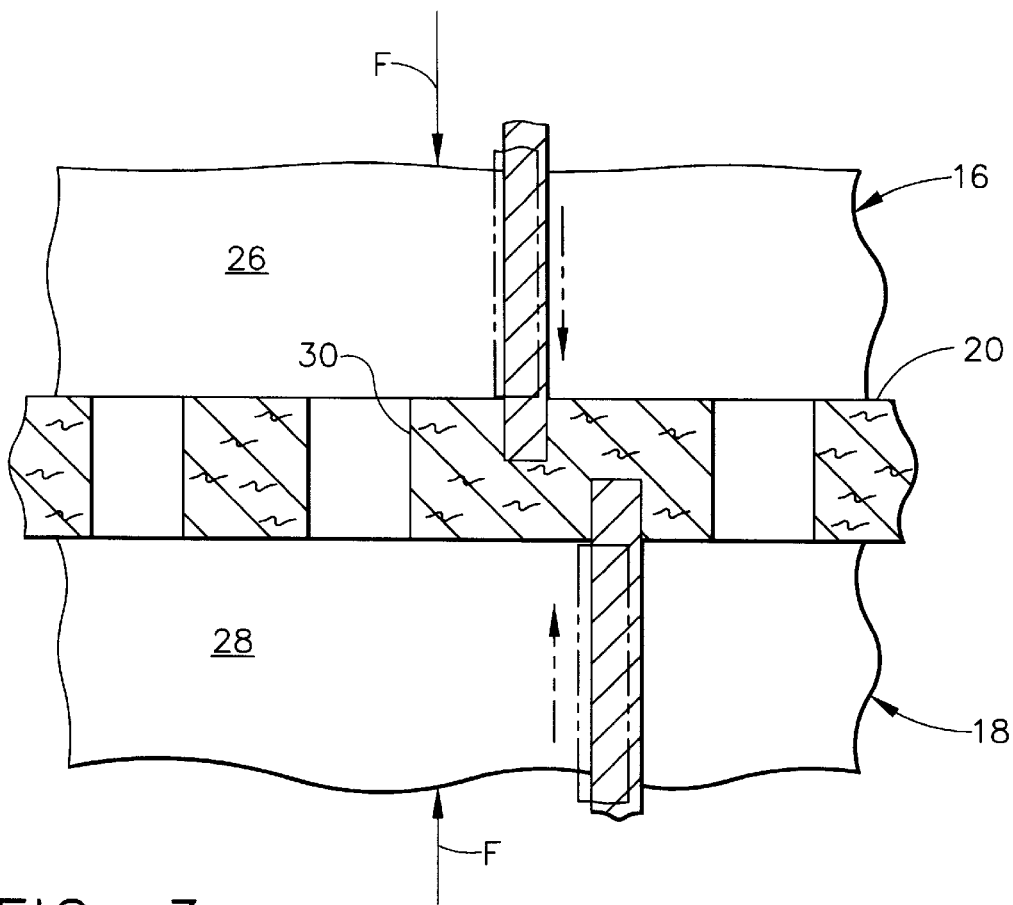
FIG. 3 is an enlarged elevational view of a portion of the liner illustrated in FIG. 2 within the dashed circle labeled 3.
Figure 4:
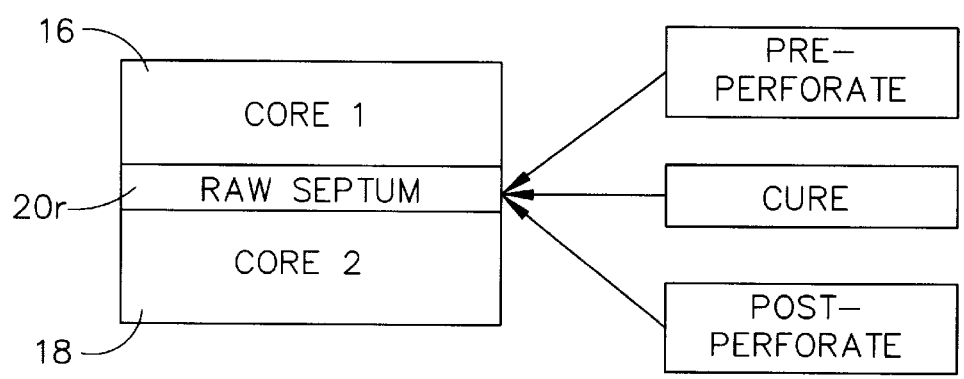
FIG. 4 is a flowchart representation of a method of manufacturing the acoustic liner illustrated in FIGS. 1–3 in accordance with an exemplary embodiment.

An improved method of making the liner 10 is illustrated with the enlarged structural detail of FIG. 3 in conjunction with the flowchart of FIG. 4. The septum 20 is perforate with a plurality of closely spaced together apertures 30 for acoustically coupling the opposite outer and inner cells 26,28 for promoting a suitable acoustic impedance and noise attenuation capability of the liner 10. The apertures 30 may be introduced in the raw septum, designated 20r, before the curing step as a pre-perforate septum, or may be introduced after the curing step in a post-perforate embodiment. In either embodiment, the raw septum 20r is cured in situ between the honeycomb cores 16,18 for integrally bonding together all three components upon curing.

The individual cores 16,18 are preferably pre-fabricated in any conventional manner and may be made from aluminum, for example. The walls defining the individual cells 26,28 are relatively thin in the range of about 0.02–0.08 mm for example, with a cell width of about 10 mm. The pre-fabricated cores 16,18 are then assembled with the raw septum 20r therebetween for undergoing integral bonding therewith upon curing.

As shown in phantom line in FIG. 3, the cells 26,28 have distal, initially exposed edges which directly abut the raw septum when assembled together with general alignment between the corresponding cells of the outer and inner cores 16,18. A suitable compressive assembly force F clamps together the two cores against the interposed raw septum, and upon curing thereof the cell edges are directly bonded to the opposite sides of the septum. In the preferred embodiment, the distal edges of the cells 26, 28 dig in or are submerged in the raw septum 20r, and upon curing thereof provide an enhanced rooted bond joint therewith.

More specifically, the raw septum 20r is preferably cured from a flexible, soft state to a rigid, hard state for simultaneously bonding together the outer and inner cores 16,18 and forming the rigid septum 20 therebetween. For example, the raw septum 20r may be a suitable thermosetting material which is cured at elevated temperature into a structurally rigid and hard state. Or, the raw septum 20r may be a suitable thermoplastic material also cured at elevated temperature to form the structurally rigid and hard septum. Other suitable types of septum material and curable manner may also be used.

Of particular significance is the in situ curing and bonding of the raw septum 20r between the pre-fabricated honeycomb cores 16,18 without the use of an additional adhesive. The raw septum 20r may have any suitable material composition which may be cured to a suitably rigid state for providing the structural requirements of the septum 20 while simultaneously effecting a bond with the opposite cores 16,18. The raw septum 20r may be a single or monolithic curable material, or may be a multi-part material including reinforcing structural fibers, such as carbon or fiberglass for example, in a corresponding curable resin matrix.

In the exemplary embodiment illustrated in FIG. 3, the septum 20 is provided in its raw state as a resin-impregnated, flexible woven fabric suitably woven to form the apertures 30 between the fibers thereof. The resin impregnates the individual fibers thereof which renders rigid the septum 20 upon curing, and also provides direct bonding to the distal edges of the cells 26, 28 pressed in abutment thereagainst.

Depending on the preferred embodiment of the raw septum 20r itself, the apertures 30 therein may be formed in the soft material prior to curing or may be formed in the hardened material after curing. In either embodiment, the apertures 30 may be integrally formed by being woven therein, or may be laser drilled, punched, or perforated therein as desired.

Another advantage of using the double purpose septum 20 for both bonding together the cores 16,18 as well as providing a functional septum therebetween is the reduced number of components and steps required for manufacturing the completed liner 10. The simplicity of merely placing the raw adhesive septum 20r between the pre-fabricated honeycomb cores 16, 18 allows slight misalignment of the cells 26,28 across the septum 20 without reduction of assembly strength, and without significant reduction in attenuation performance. The septum may be relatively thin in the exemplary range of 0.13–0.76 mm, with the apertures 30 being about 0.12 mm in diameter. The walls of the cells 26,28 are correspondingly thin and precise alignment across the thin septum is not required.

Furthermore, the integral septum 20 may be used with honeycomb cells 26,28 of any configuration, with the distal edges thereof being integrally bonded thereto. The thicknesses of the honeycomb cores 16,18 may vary as desired. Each core may have a constant height, or may vary. Inclined cores may use a correspondingly inclined septum therebetween integrally bonded therewith. The single-part adhesive sheet septum 20 therefore provides a substantial reduction in manufacturing complexity of the acoustic liner 10, with the final acoustic liner enjoying the full noise attenuation capability of double-layer acoustic liners, and without septum pore plugging by separately applied adhesive as was previously done.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A method of making an acoustic liner comprising:
   placing a raw adhesive septum in abutting contact between a pair of opposite honeycomb cores aligned and sized to effect Helmholtz resonators for attenuating noise; and
   curing said septum to integrally bond said cores thereto.
2. A method according to claim 1 wherein each of said cores includes a plurality of honeycomb cells having distal edges directly abutting said raw septum.
3. A method according to claim 2 wherein said distal edges are submerged in said raw septum.
4. A method according to claim 2 wherein said raw septum is perforate for acoustically coupling said cells on opposite sides thereof, and is cured in situ between said cores.
5. A method according to claim 2 wherein said raw septum is cured from a flexible state to a rigid state.
6. A method according to claim 2 wherein said raw septum comprises a thermosetting material, and is temperature cured.
7. A method according to claim 2 wherein said raw septum comprises a thermoplastic material, and is temperature hardened.
8. A method according to claim 2 wherein said raw septum comprises a resin impregnated flexible woven fabric, and is temperature cured rigid.
9. A method according to claim 2 wherein said cores are pre-fabricated and assembled with said raw septum for integral bonding therewith upon curing.
10. A method according to claim 2 wherein said cells are misaligned across said septum.
11. A method of making an acoustic liner comprising:
    placing a raw, perforate adhesive septum in abutting contact between a pair of opposite honeycomb cores;
    curing said septum to integrally bond said cores thereto without plugging perforations in said septum; and
    sandwiching said pair of cores between a porous face sheet and an impervious back sheet.

12. A method according to claim 11 wherein each of said cores includes a plurality of honeycomb cells having distal edges directly abutting said raw septum.

13. A method according to claim 12 wherein said distal edges are submerged in said raw septum.

14. A method according to claim 12 wherein said cells are aligned between said cores, and said perforations extend therebetween for acoustically coupling said cells on opposite sides of said septum.

15. A method according to claim 12 wherein said raw septum is cured from a flexible state to a rigid state.

16. A method according to claim 12 wherein said raw septum comprises a resin impregnated flexible woven fabric, and is temperature cured rigid.

17. A method of making an acoustic liner comprising:
   placing a raw, perforate adhesive septum in abutting contact between a pair of opposite honeycomb cores aligned and sized to effect Helmholtz resonators for attenuating noise;
   curing said septum to integrally bond said cores thereto without plugging perforations in said septum; and
   sandwiching said pair of cores between a porous face sheet and an impervious back sheet.

18. A method according to claim 17 wherein each of said cores includes a plurality of honeycomb cells having distal edges directly abutting said raw septum and submerged therein.

19. A method according to claim 18 wherein said cells are aligned between said cores, and said perforations extend therebetween for acoustically coupling said cells on opposite sides of said septum.

20. A method according to claim 19 wherein said raw septum comprises a resin impregnated flexible woven fabric, and is temperature cured rigid.

21. A method according to claim 1 wherein said septum is bonded to said cores upon curing without separately pre-applying an adhesive therebetween.

22. A method according to claim 11 wherein said septum is bonded to said cores upon coring without separately pre-applying an adhesive therebetween.

23. A method according to claim 17 wherein said septum is bonded to said cores upon curing without separately pre-applying an adhesive therebetween.

24. A method according to claim 1 wherein said septum includes a curable resin matrix extending therethrough between opposite sides thereof for bonding together said cores upon curing thereof.

25. A method according to claim 11 wherein said septum includes a curable resin matrix extending therethrough between opposite sides thereof for bonding together said cores upon curing thereof.

26. A method according to claim 17 wherein said septum includes a curable resin matrix extending therethrough between opposite sides thereof for bonding together said cores upon curing thereof.

27. A method according to claim 1 wherein said septum is a single part directly bonding together said pair of cores thereat without additional adhesive therebetween.

28. A method according to claim 11 wherein said septum is a single part directly bonding together said pair of cores thereat without additional adhesive therebetween.

29. A method according to claim 17 wherein said septum is a single part directly bonding together said pair of cores thereat without additional adhesive therebetween.

* * * * *